(12) United States Patent
Dellian et al.

(10) Patent No.: US 7,656,095 B2
(45) Date of Patent: Feb. 2, 2010

(54) LIGHT SYSTEM WITH DIELECTRIC BARRIER DISCHARGE LAMP, OPERATING DEVICE AND CONNECTION CABLE

(75) Inventors: Harald Dellian, Edling (DE); Jörg Rink, Syrgenstein (DE)

(73) Assignee: Osram Gesellschaft mit beschraenkter Haftung, Munich (DE)

( * ) Notice: Subject to any disclaimer, the term of this patent is extended or adjusted under 35 U.S.C. 154(b) by 84 days.

(21) Appl. No.: 11/727,029

(22) Filed: Mar. 23, 2007

(65) Prior Publication Data

US 2008/0007185 A1    Jan. 10, 2008

(30) Foreign Application Priority Data

Mar. 31, 2006   (DE) .................. 20 2006 005 212 U

(51) Int. Cl.
*H01J 19/80*   (2006.01)
(52) U.S. Cl. .......................... 315/39; 315/58; 315/246
(58) Field of Classification Search ............. 315/38–39, 315/246, 260, 268, 271, 291, 56, 58–60; 313/243, 595, 631
See application file for complete search history.

(56) References Cited

U.S. PATENT DOCUMENTS

| | | | |
|---|---|---|---|
| 5,604,410 A | | 2/1997 | Vollkommer et al. |
| 6,239,559 B1 * | | 5/2001 | Okamoto et al. ............ 315/307 |
| 6,323,600 B1 | | 11/2001 | Statnic et al. |
| 6,373,198 B1 * | | 4/2002 | Gielen et al. ................ 315/248 |
| 6,919,686 B2 * | | 7/2005 | Okamoto et al. ............ 313/594 |
| 2001/0013759 A1 * | | 8/2001 | Thiel et al. .................. 315/246 |
| 2003/0001515 A1 * | | 1/2003 | Okamoto et al. ............ 315/219 |
| 2005/0134201 A1 * | | 6/2005 | Lecheler et al. ............. 315/308 |
| 2005/0253525 A1 * | | 11/2005 | Rink ........................... 313/634 |
| 2006/0066245 A1 * | | 3/2006 | Bschorer et al. ............. 315/56 |
| 2007/0063659 A1 * | | 3/2007 | YAamashita et al. ........ 315/360 |
| 2007/0163800 A1 * | | 7/2007 | Clark et al. ............. 174/113 C |

* cited by examiner

*Primary Examiner*—David Hung Vu
*Assistant Examiner*—Tung X Le

(57) ABSTRACT

A lighting system with a dielectric barrier discharge lamp (2) and an operating device (1) is connected to a high-voltage flat ribbon cable (6). As a result, the capacitive line losses can be minimized and both the ignition behavior and the power consumption of the lamp (2) can be improved.

15 Claims, 1 Drawing Sheet

LIGHT SYSTEM WITH DIELECTRIC BARRIER DISCHARGE LAMP, OPERATING DEVICE AND CONNECTION CABLE

TECHNICAL FIELD

The invention is based on a lighting system which comprises a dielectric barrier discharge lamp, an operating device for operating the dielectric barrier discharge lamp and a connection cable, the connection cable connecting the dielectric barrier discharge lamp to the operating device.

BACKGROUND ART

Application fields of dielectric barrier discharge lamps which are of importance at present are those of office automation, in particular linear lamps for scanners, fax machines and similar appliances and large-area, flat lamps, so-called flat radiators, for backlighting monitors and television screens using liquid crystal technology and other graphical displays. However, the invention is not restricted to these application areas. Instead, further application areas exist, for example in UV treatment in trade and industry, in general lighting, in luminaire design etc.

Dielectric barrier discharge lamps are known, when considered per se, and have been extensively documented in the meantime in the prior art. They are characterized by the fact that the electrodes are separated from the discharge medium located in the interior of the discharge vessel by a dielectric. In this case, in principle the electrodes can either be arranged with them all on the inside, all on the outside or with the electrode(s) of one polarity on the inside and the other(s) on the outside of the discharge vessel. For electrodes arranged on the outside of the discharge vessel, the wall of the discharge vessel acts as a dielectric barrier. If all of the electrodes are arranged inside the discharge vessel, however, at least one electrode or the electrodes of one polarity need to be separated from the interior of the discharge vessel by a dielectric, for example by a dielectric coating. This dielectric barrier results in a so-called dielectrically impeded discharge on one side during operation. Alternatively, all of the inner electrodes may also be provided with a dielectric coating. This is a dielectrically impeded discharge on both sides. The latter relates in particular also to the already mentioned case in which all of the electrodes are arranged outside of the discharge vessel.

Owing to the dielectric barrier between at least one electrode and the discharge medium, a voltage which changes over time, for example a sinusoidal AC voltage, is required for operating a dielectric barrier discharge lamp. The pulsed operation documented in U.S. Pat. No. 5,604,410 has proven to be particularly efficient.

The document U.S. Pat. No. 6,323,600 has disclosed a circuit arrangement for operating a dielectric barrier discharge lamp in accordance with the abovementioned pulsed operation. For this purpose, pulse voltage sequences of a few kilovolts (kV) and pulse repetition frequencies of typically from 25 to 80 kHz are produced with the aid of a flyback converter.

One disadvantage is the fact that conventional high-voltage cables—these are generally individual cables—have high losses owing to their relatively high capacitance at high frequencies. Since the capacitance of a dielectric barrier discharge lamp is lower than the capacitance of long, conventional high-voltage cables, the actual power injected into the connected lamp is thus reduced. These effects are particularly important during the pulsed operation mentioned above, since the pulse voltages have other higher-frequency components in addition to the pulse repetition frequency of typically from 50 to 200 kHz. In particular in the case of relatively long high-voltage cables, the power losses can even result in the lamp no longer being ignited. Therefore, until now only relatively short connection cables have been used, typically of approximately from 25 to 35 cm in length.

DISCLOSURE OF THE INVENTION

The object of the present invention is to provide a lighting system with a dielectric barrier discharge lamp, an operating device for operating the dielectric barrier discharge lamp and an improved connection cable.

This object is achieved by a lighting system having a dielectric barrier discharge lamp, an electrical operating device, having two high-voltage terminals, an electrical connection cable, which comprises two high-voltage wires, which connect the electrodes of the dielectric barrier discharge lamp to the high-voltage terminals of the electrical operating device, whereby the connection cable is designed as a high-voltage flat ribbon cable.

The invention is based on the knowledge that the losses in conventional high-voltage connection cables between the dielectric barrier discharge lamp and the operating device likewise increase as the cable length and frequency increase and that this results in reduced power being injected into the lamp, which may even result in the lamp not being ignited. This is attributed to the high electrical capacitance of conventional high-voltage connection cables in comparison with dielectric barrier discharge lamps.

The invention now proposes designing the high-voltage connection cable as a high-voltage flat ribbon cable, which, in its simplest embodiment, has two wires. The distance between the high-voltage wires is in this case dimensioned such that the capacitance of the high-voltage flat ribbon cable is so low that significant power losses or ignition problems no longer occur. As a reference value, the inventors have found that the capacitance of the high-voltage flat ribbon cable should be approximately equal to or less than the capacitance of the unignited lamp. The suitable distance between the high-voltage wires also depends, in addition to the other dimensions of the cable, on the capacitance of the associated dielectric barrier discharge lamp. Typical values are a few mm, in the case of a typical linear dielectric barrier discharge lamp, as is used inter alia in devices for office automation, for example approximately from 8 to 12 mm from wire center to wire center. In particular if the field of use requires relatively long connection cables, for example more than 30 cm, 40 cm, 50 cm or even 60 cm, the high-voltage flat ribbon cable proposed according to the invention has marked advantages over conventional connection cables, both as regards the ignition and the power injection of a dielectric barrier discharge lamp connected, even and especially during pulsed operation.

In one development of the high-voltage flat ribbon cable according to the invention, at least one further wire is provided between the two outer wires, which are intended and designed for the high voltage. This solution has the advantage of being able to realize a protection class I application in a simple manner. For this purpose, only the at least one additional wire needs to be connected, on the one hand, to ground potential and, on the other hand, to a metallic housing, lamp mount etc., to which the dielectric barrier discharge lamp is connected or is intended to be protected in terms of high voltages. The additional wire in the center therefore acts as the protective ground conductor. In addition, the electromagnetic interference radiation is also reduced, i.e. the electromagnetic compatibility (EMC) of the entire lighting system is improved.

In some applications it is advantageous if the connection cable is flexible, for example if the dielectric barrier discharge lamp rests on a movable mount, for example on the carriage of a scanner device or the like. The flexibility can be achieved effectively in general in the case of a flat ribbon cable with suitable insulating material, in particular if the individual wires are for their part in each case in the form of a braided wire.

In addition, it is nevertheless preferred, owing to the relatively high frequencies, in particular during the pulsed operation mentioned at the outset, to design the individual wires as braided wires. As a result, the current-carrying capacity of the high-voltage flat ribbon cable is improved despite the skin effect increasing with the frequency.

In general, the high-voltage flat ribbon cable can be composed both of a plurality of in each case insulated wires, which are arranged next to one another parallel in a common plane and are fixed in this flat arrangement by a cable sheath, for example by means of sheathing consisting of silicone rubber. The wires can likewise also be embedded in a common flat insulating sheath. It is only critical that there is a sufficient distance between the two outer wires in order to keep the electrical capacitance of these two wires provided for the high voltage as low as possible. Further details in this regard are given in the description below relating to the exemplary embodiments.

BRIEF DESCRIPTION OF THE DRAWINGS

The invention will be explained in more detail below with reference to exemplary embodiments. In the figures.

BEST MODE FOR CARRYING OUT THE INVENTION

Figure 1A:
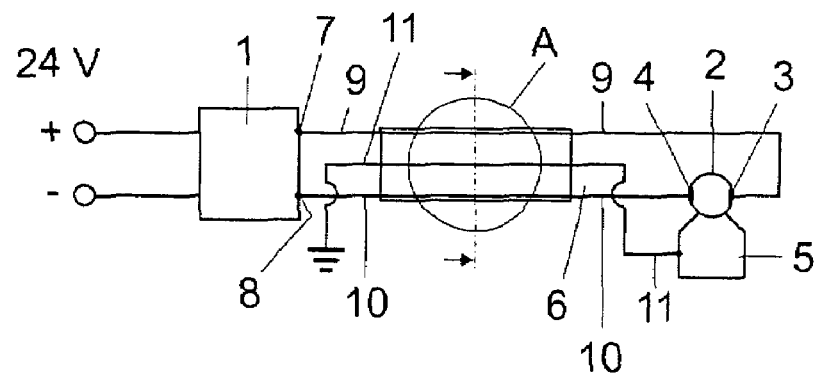
FIG. 1a shows an exemplary embodiment of the lighting system according to the invention with a high-voltage flat ribbon cable.
Figure 1B:
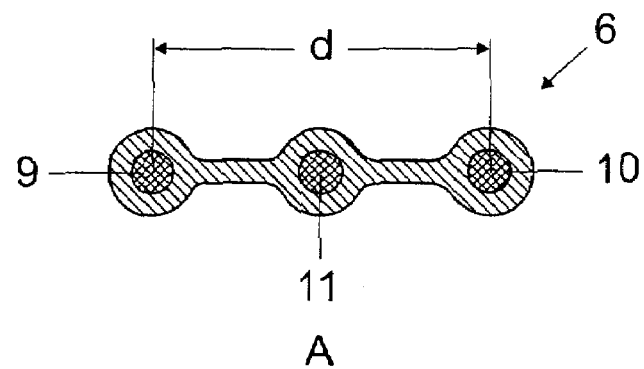
FIG. 1b shows a detail view of the high-voltage flat ribbon cable in a cross-sectional illustration.

FIG. 1a shows, in a schematic illustration, a lighting system according to the invention having an operating device 1, a linear dielectric barrier discharge lamp 2, having two elongated electrodes 3, 4, which are arranged on the inside of the lamp vessel and are each covered by a dielectric layer (not illustrated), the dielectric barrier discharge lamp 2 being fixed on a metallic mount 5, and having a flexible connection cable 6 which is approximately 70 cm long. The latter is a three-wire high-voltage flat ribbon cable, for further details on which reference is made below to FIG. 1b, which shows an enlarged cross section of the cable. The operating device 1 is designed for pulsed operation in accordance with U.S. Pat. No. 5,604,410 mentioned at the outset. For this purpose, a circuit arrangement in accordance with U.S. Pat. No. 6,323,600, which is likewise mentioned at the outset, is used. It is not necessary here to go into any more details in terms of the circuitry since these details are not essential to the understanding of the invention. The operating device 1 is fed on the input side with a DC voltage of +24 V. Optionally, the negative terminal can also be connected to ground. On the output side, the operating device 1 has two high-voltage terminals 7, 8, which are connected to the two outer wires 9, 10 of the connection cable 6. The central wire 11 is connected, on the one hand, to the ground potential and, on the other hand, to the metallic mount 5, i.e. it acts as a protective ground conductor here. All of the wires 9-11 are in the form of braided wires in order, on the one hand, to ensure the flexibility of the high-voltage flat ribbon cable 6. On the other hand, the braided wires of the two outer high-voltage wires 9 and 10 provide sufficient current transport of the high-frequency currents. For this purpose, each of the three braided wires 9-11 comprises 19 individual wires. The distance d between the two outer braided wires 9 and 10 is approximately 10 mm from braided-wire center to braided-wire center. The high-voltage strength is 6 kV.

For use areas which do not require a protective ground conductor, the central wire 11 remains unassigned, i.e. it is not connected anywhere (not illustrated here). In general, in these cases it is even possible to dispense with the central wire entirely, i.e. the connection cable is then designed as a two-wire high-voltage flat ribbon cable. It is in any case decisive that the minimum distance between the two high-voltage wires is maintained.

Figure 2:
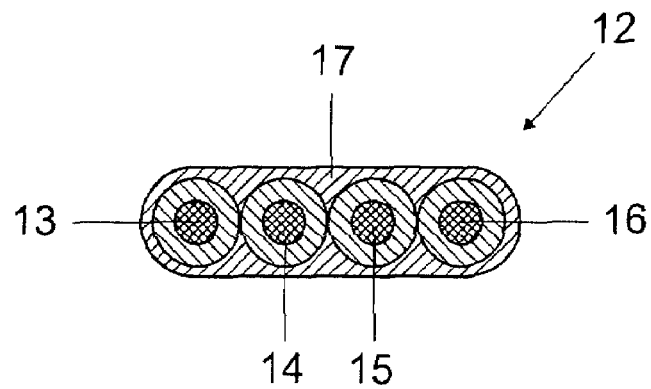
FIG. 2 shows an alternative high-voltage flat ribbon cable in a cross-sectional illustration.

FIG. 2 illustrates an alternative flat, four-wire connection cable 12 schematically. The four-wire connection cable 12 is in the form of a flat composite of four insulated braided wires 13, 14, 15, 16, which are arranged next to one another parallel. The sheath 17 of the connection cable 12 consists of silicone rubber, into which the insulated braided wires 13, 14, 15, 16 are embedded and fixed. The two outer wires 13, 16 are envisaged for a high voltage of approximately 6 kV. Therefore, in each case the braided cable wire CSA type TV-6, silicone rubber 150° C. FT1 by KURABE is provided for this purpose. The braided wires 13, 16 each comprise 19 individual wires. The braided-wire diameter is approximately 0.75 mm, and the outer diameter of the braided cable wires is approximately 2 mm. The two central wires 14, 15 are in this case primarily used for producing the distance between the two high-voltage braided wires 13, 16 which is required for a connection which is as low-loss as possible. This distance is in the present case approximately from 8 to 10 mm. If necessary, one or else both of the central braided wires 14, 15 can also be used as the protective ground conductor. In any case, the relatively expensive KURABE braided cable wire need not necessarily be used for the central wires 14, 15. Instead, inexpensive highly flexible braided cable wires are suitable for this purpose. The four-wire design of the connection cable 12 shown in FIG. 2 has the advantage that the distance required between the two outer high-voltage wires 13, 16 can be realized in a relatively simple manner. For this purpose, the four individual cables 13-16 only need to be laid directly next to one another and then sheathed.

In one variant (not illustrated), the above-explained cable composite has only three wires. The saving of one wire has the advantage of lower costs, but it is slightly more complex to maintain the minimum distance between the two outer wires, since parts of the interspace need to be filled with the material of the sheathing.

What is claimed is:

1. A lighting system having a dielectric barrier discharge lamp, an electrical operating device, having two high-voltage terminals, an electrical connection cable, which comprises two high-voltage wires, which connect electrodes of the dielectric barrier discharge lamp to the high-voltage terminals of the electrical operating device, wherein the connection cable is a high-voltage flat ribbon cable in which the high-voltage wires have a distance from one another which is larger than is required for dielectric strength such that the capacitance of the high-voltage flat ribbon cable is approximately equal to or less than the capacitance of the unignited dielectric barrier discharge lamp.

2. The lighting system as claimed in claim 1, the high-voltage flat ribbon cable being designed such that an electrical capacitance value between the two high-voltage wires is as low as possible.

3. The lighting system as claimed in claim 2, the high-voltage wires having a distance from one another which is larger than is required for the dielectric strength.

4. The lighting system as claimed in claim 1, the wires being spaced apart from one another by spacers.

5. The lighting system as claimed in claim 4, the spacers being in the form of insulating webs.

6. The lighting system as claimed in claim 1, the wires being in the form of braided wires.

7. The lighting system as claimed in claim 1, the number of wires of the high-voltage flat ribbon cable being at least three, and the two outer wires being the two high-voltage wires.

8. The lighting system as claimed in claim 7, the at least one further wire, which is arranged between the two high-voltage wires, being connected to ground potential.

9. The lighting system as claimed in claim 1, the high-voltage flat ribbon cable being composed of in each case one individual cable per wire, and the individual cables being arranged in a plane parallel next to one another to form a common flat ribbon cable composite.

10. The lighting system as claimed in claim 9, two or more individual cables being arranged between the two individual cables with the high-voltage wires.

11. The lighting system as claimed in claim 10, the individual cables arranged next to one another being sheathed by a common sheathing.

12. The lighting system as claimed in claim 9, the individual cables arranged next to one another being sheathed by a common sheathing.

13. The lighting system as claimed in claim 1, the high-voltage flat ribbon cable being designed for high voltages of several kilovolts, in particular of from 2 kV to 10 kV.

14. The lighting system as claimed in claim 1, the operating device being designed for pulsed operation of the dielectric barrier discharge lamp.

15. The lighting system as claimed in claim 14, the operating device being designed for pulse repetition frequencies of from 50 to 200 kHz.

* * * * *